(12) United States Patent
Poy

(10) Patent No.: US 7,467,701 B2
(45) Date of Patent: Dec. 23, 2008

(54) MULTIPLE-STAGE MAGNETIC CLUTCH COIL

(75) Inventor: Alfred Lim Poy, Livonia, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 205 days.

(21) Appl. No.: 11/121,774

(22) Filed: May 4, 2005

(65) Prior Publication Data

US 2006/0249348 A1   Nov. 9, 2006

(51) Int. Cl.
*F16D 27/112* (2006.01)

(52) U.S. Cl. .................. 192/84.2; 192/84.961

(58) Field of Classification Search ............. 192/52.4, 192/84.2
See application file for complete search history.

(56) References Cited

U.S. PATENT DOCUMENTS

| | | | | |
|---|---|---|---|---|
| 727,641 | A | * | 5/1903 | Knowlton .............. 192/84.2 |
| 727,689 | A | * | 5/1903 | Reist .................... 192/84.2 |
| 1,252,312 | A | | 1/1918 | Warren |
| 1,671,057 | A | * | 5/1928 | Brainard ................ 192/84.2 |
| 2,605,877 | A | | 8/1952 | Winther |
| 2,807,147 | A | | 9/1957 | Jacobs |
| 2,848,085 | A | | 8/1958 | Mannaioni |
| 2,881,597 | A | | 4/1959 | Jacobs |
| 3,366,207 | A | | 1/1968 | Willsea |
| 3,400,797 | A | | 9/1968 | Horn et al. |
| 3,425,529 | A | * | 2/1969 | Hayashi ............. 192/84.941 |
| 3,429,192 | A | | 2/1969 | Allen |
| 3,675,747 | A | | 7/1972 | Obermark |
| 4,169,360 | A | * | 10/1979 | Shimizu ................ 62/323.2 |
| 4,376,476 | A | | 3/1983 | Hagiri |
| 4,487,029 | A | | 12/1984 | Hidaka et al. |
| 4,488,627 | A | | 12/1984 | Streich et al. |
| 4,564,092 | A | | 1/1986 | Pierce |
| 4,734,817 | A | | 3/1988 | Baker et al. |
| 5,159,522 | A | | 10/1992 | Gray |
| 5,195,625 | A | * | 3/1993 | Chang et al. ......... 192/84.941 |
| 5,295,038 | A | | 3/1994 | Matsushita et al. |
| 6,019,693 | A | | 2/2000 | Ban et al. |
| 6,199,391 | B1 | | 3/2001 | Link et al. |
| 6,460,671 | B1 | | 10/2002 | Karambelas et al. |
| 6,672,443 | B2 | | 1/2004 | Iwazaki et al. |

FOREIGN PATENT DOCUMENTS

| | | | |
|---|---|---|---|
| JP | 55-119229 | A | 12/1980 |
| JP | 59-196920 | A | 8/1984 |
| JP | 2006-342937 | A * | 12/2006 |

* cited by examiner

*Primary Examiner*—Richard M. Lorence
(74) *Attorney, Agent, or Firm*—Brinks Hofer Gilson & Lione

(57) ABSTRACT

An electromagnetic clutch includes an armature plate connected to a shaft and being movable axially with respect to the shaft, a rotor being rotatable relative to the shaft, and a plurality of electromagnetic coils, wherein when at least one of the electromagnetic coils are energized a magnetic field will draw the armature plate into contact with the rotor such that the rotor and the shaft are rotatably connected. The magnetic coils are connected to a common power supply providing the magnetic coils a common, non-varying, voltage and a master control switch selectively supplies power from the power supply to the magnetic coils. The magnetic coils are connected to one another in parallel and each coil has a switch to allow each coil to be energized independently of the other coils, individually or in any combination to provide a magnetic field of varying strength.

9 Claims, 3 Drawing Sheets

MULTIPLE-STAGE MAGNETIC CLUTCH COIL

FIELD OF THE INVENTION

The present invention relates to a multiple stage electromagnetic clutch. Specifically, the present invention relates to an electromagnetic clutch having a plurality of independently actuated magnetic coils.

BACKGROUND OF THE INVENTION

Prior art magnetic clutches have used a single coil winding in the field coil. In order to vary the strength of the magnetic field, the voltage across the magnetic coil is varied. The electric and electronic components needed to vary the supply voltage are complicated and expensive, therefore, there is a need for an electromagnetic clutch that provides a variable electromagnetic field without the use of complicated voltage varying devices.

SUMMARY OF THE INVENTION

In an aspect of the present invention, a compressor is provided having an electromagnetic clutch including an armature plate rotatably connected to a shaft and being movable axially with respect to the shaft, a pulley that is rotatable relative to the shaft, and a plurality of electromagnetic coils housed within a coil housing. When at least one of the electromagnetic coils are energized, a magnetic field will draw the armature plate into contact with the pulley such that the pulley and the shaft are rotatably connected to one another via friction between the armature plate and the pulley. The magnetic coils are energized independently of one another such that the magnetic coils can be energized individually or in any combination to provide a magnetic field of varying strength.

In another aspect, the magnetic coils are connected to a common power supply providing the magnetic coils a common, non-varying, voltage. The electromagnetic clutch includes a master control switch to selectively supply power from the power supply to all of the magnetic coils of the electromagnetic clutch.

In still another aspect, the magnetic coils are electrically connected to one another in parallel and each coil has a switch to allow each individual coil to be energized independently of the other coils.

In yet another aspect, the plurality of magnetic coils are aligned with one another axially within the coil housing, and in still yet another aspect, the plurality of magnetic coils are aligned radially with one another within the coil housing.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
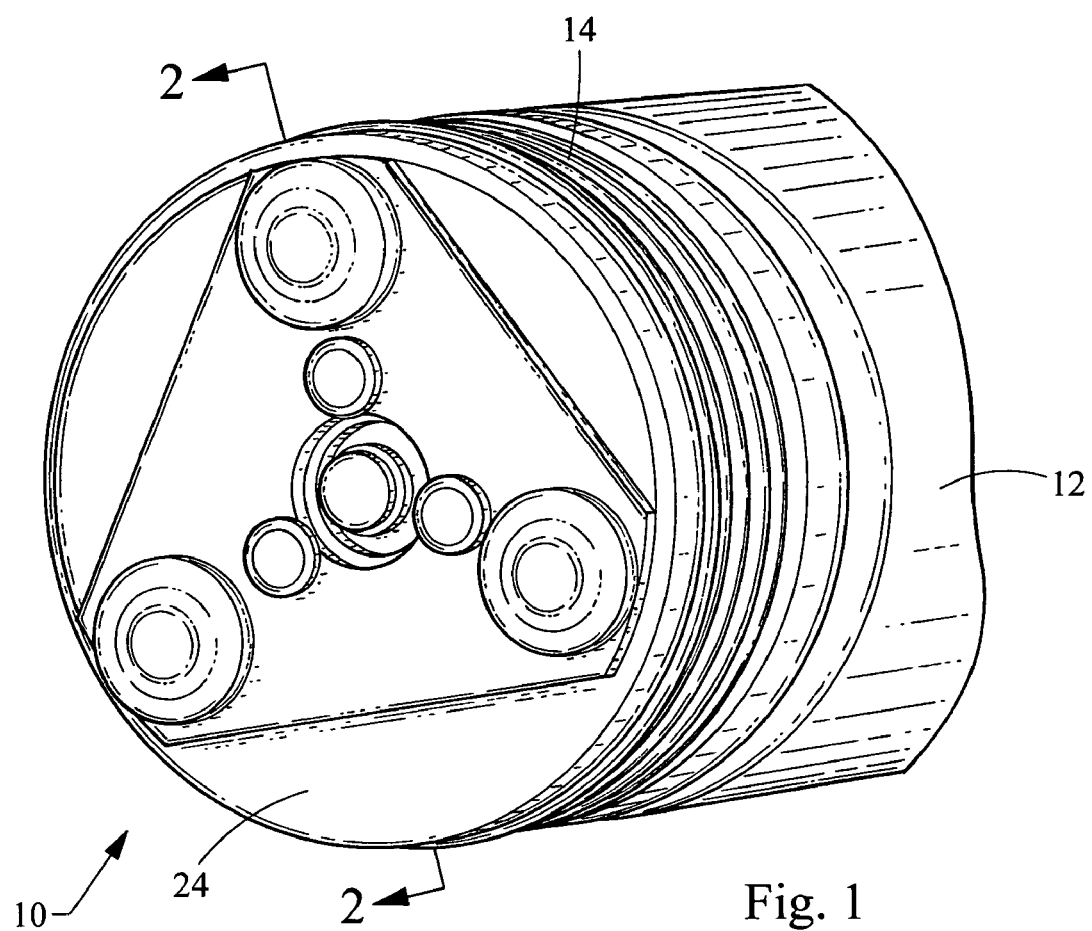
FIG. 1 is a perspective view of a compressor of the present invention.

A compressor for an automobile of the present invention is shown generally at 10 in FIG. 1. The compressor includes a housing 12 and a pulley 14. The pulley 14 is rotatably mounted onto the compressor housing 12 and is adapted to engage a belt or chain (not shown) that transfers rotational movement from the engine of the automobile to the pulley 14.

Figure 2:
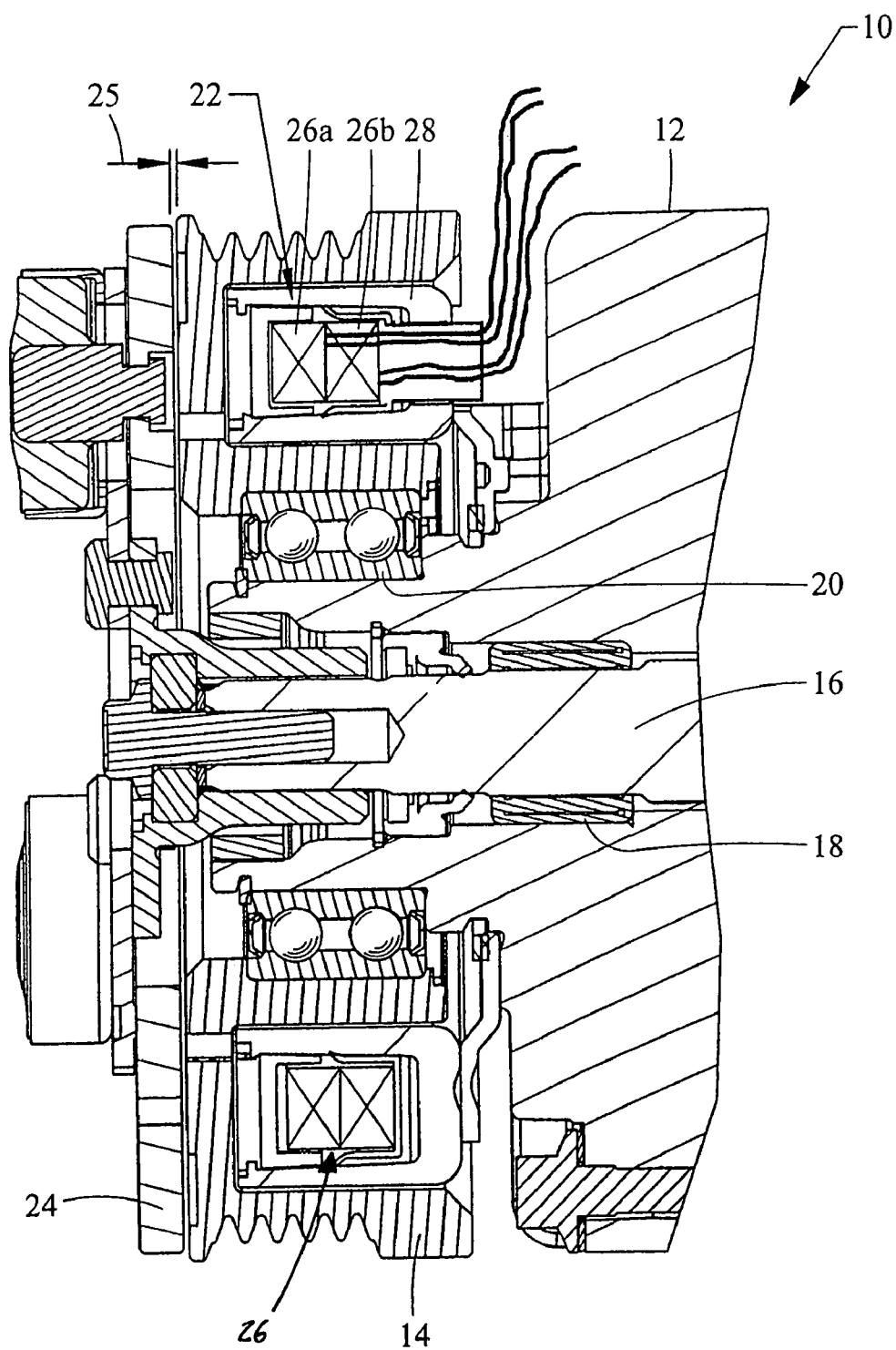
FIG. 2 is a side sectional view taken along lines 2-2 of FIG. 1.

Referring to FIG. 2, the compressor 10 includes a shaft 16 that is rotatably mounted within the compressor 10. The shaft 16 drives the inner components of the compressor 10. The shaft 16 is supported within the compressor 10 by a bearing 18. This bearing 18 allows the shaft to rotate relative to the compressor housing 10. The pulley 14 is also supported on the compressor housing 12 by a bearing 20. This bearing 20 allows the pulley 14 to rotate relative to the housing 12.

The compressor 10 includes an electromagnetic clutch 22 to selectively connect the pulley 14 to the shaft 16 such that rotation of the pulley 14 is transferred to the shaft 16 to drive the compressor 10. The electromagnetic clutch 22 includes an armature plate 24 that is rotatably mounted onto a distal end of the shaft 16. The armature plate 24 is mounted in such a way that the armature plate 24 is allowed to move axially with respect to the shaft 16 and the compressor 10. The armature plate 24 can be in a position where there is an axial gap 25 between the armature plate 24 and the pulley 14, as shown in FIG. 2. In this position, the pulley 14 is free to rotate and no rotational motion is transferred to the armature plate. However, the armature plate 24 can move to a position where the armature plate 24 contacts the pulley 14. If the armature plate 24 is brought into contact with the pulley 14, friction between the pulley 14 and the armature plate 24 will cause rotational movement to be transferred from the pulley 14 to the armature plate 24, and thus to the shaft 16.

Within the pulley 14, a plurality of electromagnetic coils 26 are housed within a coil housing 28. When at least one of the electromagnetic coils 26 is energized a magnetic field is generated. The coil housing 28 directs the electromagnetic field outward, across the gap 25, such that the magnetic field draws the armature plate 24 axially toward the pulley 14. Once the armature plate 24 contacts the pulley 14, the magnetic field will keep the armature plate 24 in contact with the pulley 14 so rotational movement will be frictionally transferred between the armature plate 24 and the pulley 14.

Referring to FIG. 2, two magnetic coils are shown 26a, 26b. The present invention could be practiced with any appropriate number of magnetic coils depending upon the particular application. The magnetic coils 26a, 26b are energized independently of one another. The magnetic coils 26a, 26b can be energized individually or in any combination to provide a magnetic field of varying strength. This allows the electromagnetic clutch 22 to provide a high magnetic force of engagement between the pulley 14 and the armature plate 24 when needed, such as during a start-up, or during a high load situation. At these times, a large portion, or all of the magnetic coils 26 can be energized to provide a high strength magnetic field to draw the armature plate 24 into contact with the pulley 14 with a large force. This will provide a corresponding large friction force between the pulley 14 and the armature plate 24. Alternatively, during low load situations, a portion of the magnetic coils 26 can be left de-energized, thereby causing the electromagnetic clutch 22 to operate more efficiently and not waste excess electric current, while still providing a strong enough magnetic field to keep the armature plate 24 in contact with the pulley 14 such that rotational movement is transferred therebetween.

Figure 3:
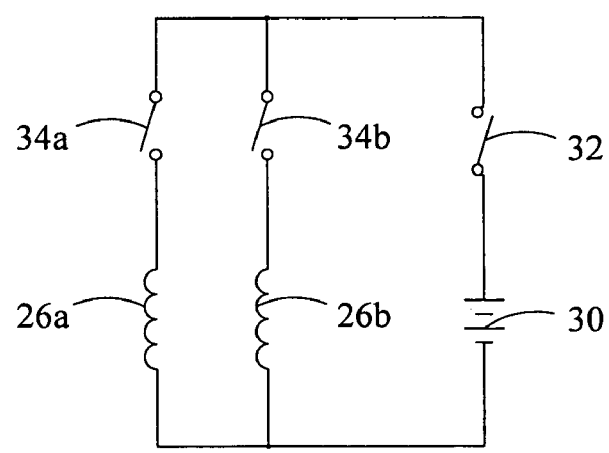
FIG. 3 is a schematic view of the electrical circuit of the electromagnetic clutch of the present invention.

Referring to FIG. 3, the magnetic coils 26a, 2Gb are connected to a common, non-varying power supply 30. A master control switch 32 is positioned between the magnetic coils 26a, 26b and the power supply 30 to selectively energize the electromagnetic clutch 22. The magnetic coils 26a, 26b are electrically connected to one another in parallel and each magnetic coil 26a, 26b has a switch 34a, 34b to allow each individual magnetic coil 26a, 26b to be energized independently.

Figure 4:
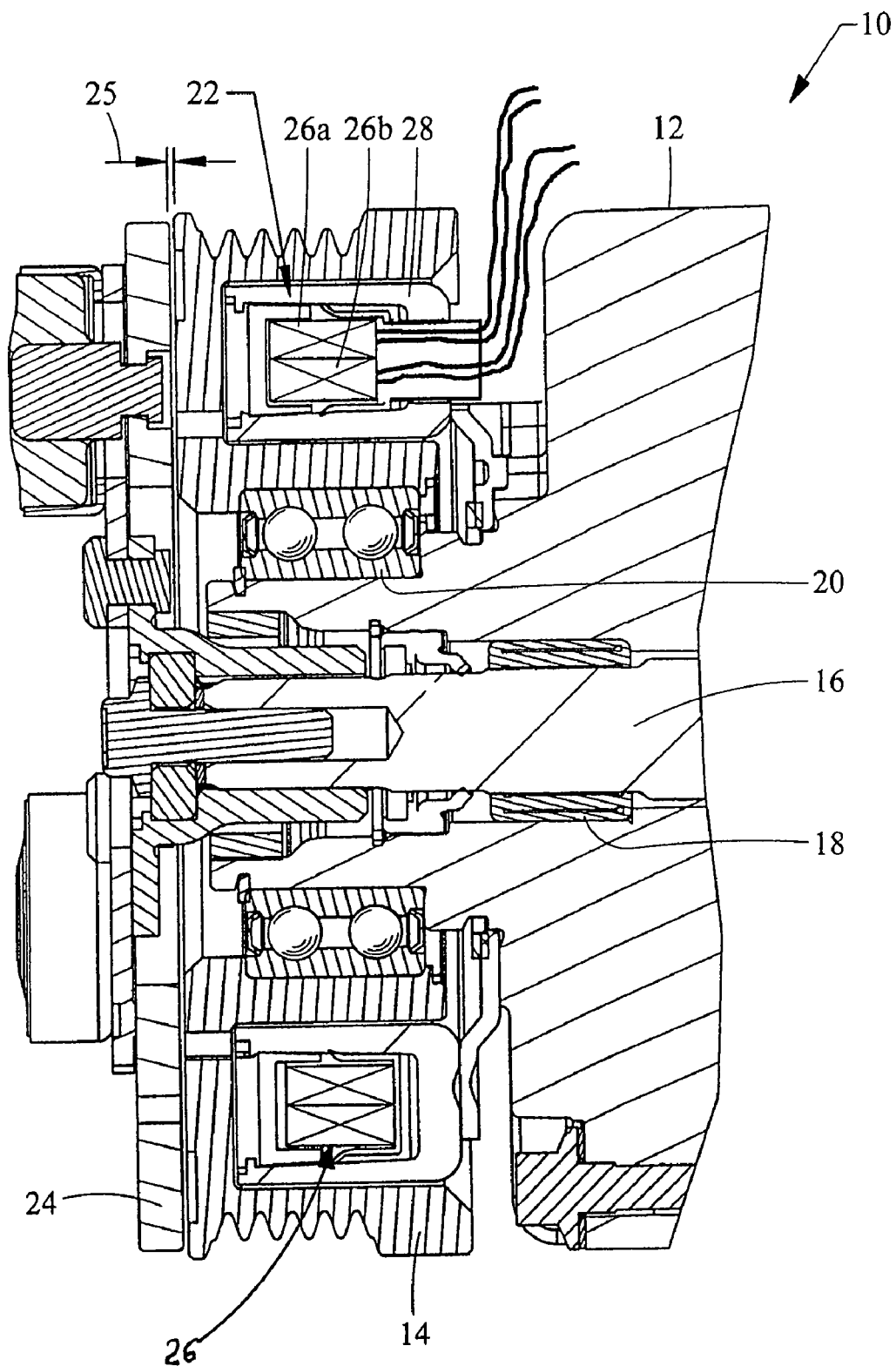
FIG. 4 is a side sectional view similar to FIG. 2 of an alternate embodiment of the present invention.

As shown in FIG. 2, the magnetic coils 26a, 26b are aligned with one another axially within the coil housing 28. Alternatively, the magnetic coils 26a, 26b can be aligned radially with one another within the coil housing 28, as shown in FIG. 4. Any appropriate number of magnetic coils 26 could be utilized and positioned in any arrangement suitable for the particular application.

In accordance with the provisions of the patent statutes, the present invention has been described in what is considered to represent its preferred embodiment. However, it should be noted that the invention can be practiced otherwise than as specifically illustrated and described.

What is claimed is:

1. An electromagnetic clutch comprising:
   an armature plate rotatably connected to a shaft, the armature plate being movable axially with respect to the shaft;
   a pulley, the pulley being rotatable relative to the shaft;
   a plurality of electromagnetic coils housed within a coil housing being stationary relative to the pulley such that when at least one of the electromagnetic coils is energized a magnetic field will draw the armature plate into contact with the pulley such that the pulley and the shaft are rotatably connected to one another via friction between the armature plate and the pulley;
   the plurality of magnetic coils being axially aligned with one another at a common radial position and being energized independently of the other coils such that the magnetic coils can be energized individually or in any combination to provide a magnetic field of varying strength without employing a voltage varying device that varies voltage while voltage is being applied.

2. The electromagnetic clutch of claim 1 wherein the magnetic coils are connected to a common power supply providing the magnetic coils a common, non-varying, voltage.

3. The electromagnetic clutch of claim 2 further including a master control switch to selectively supply power from the power supply to all of the magnetic coils of the electromagnetic clutch.

4. The electromagnetic clutch of claim 3 wherein the magnetic coils are electrically connected to one another in parallel and each coil has a switch to allow each individual coil to be energized independently of the other coils.

5. An electromagnetic clutch comprising:
   an armature plate rotatably connected to a shaft, the armature plate being movable axially with respect to the shaft;
   a pulley, the pulley being rotatable relative to the shaft;
   a plurality of electromagnetic coils housed within a coil housing being stationary relative to the pulley such that when at least one of the electromagnetic coils is energized a magnetic field will draw the armature plate into contact with the pulley such that the pulley and the shaft are rotatably connected to one another via friction between the armature plate and the pulley;
   the magnetic coils being axially aligned with one another at a common radial position and being connected to a common power supply providing the magnetic coils a common, non-varying, voltage;
   a master control switch to selectively supply power from the power supply to all of the magnetic coils of the electromagnetic clutch;
   the magnetic coils being electrically connected to one another in parallel and each coil having a switch to allow each individual coil to be energized independently of the other coils such that the magnetic coils can be energized individually or in any combination to provide a magnetic field of varying strength without employing a voltage varying device that varies voltage while voltage is being applied.

6. A compressor for an automobile comprising:
   a rotatable shaft for driving the compressor;
   a rotatable pulley for engaging an output of the engine of the automobile; and
   an electromagnetic clutch adapted to selectively connect the pulley and the shaft to transfer rotational motion from the pulley to the shaft;
   the electromagnetic clutch including an armature plate rotatably connected to the shaft and being movable axially with respect to the shaft, and a plurality of electromagnetic coils housed within a coil housing being stationary relative to the pulley such that when at least one of the electromagnetic coils is energized a magnetic field will draw the armature plate into contact with the pulley such that the pulley and the shaft are rotatably connected to one another via friction between the armature plate and the pulley;
   the magnetic coils being axially aligned with one another at a common radial position and being energized independently of the other coils such that the magnetic coils can be energized individually or in any combination to provide a magnetic field of varying strength without employing a voltage varying device that varies voltage while voltage is being applied.

7. The compressor of claim 6 wherein the magnetic coils are connected to a common power supply providing the magnetic coils a common, non-varying, voltage.

8. The compressor of claim 7 further including a master control switch to selectively supply power from the power supply to all of the magnetic coils of the electromagnetic clutch.

9. The compressor of claim 8 wherein the magnetic coils are electrically connected to one another in parallel and each coil has a switch to allow each individual coil to be energized independently of the other coils.

* * * * *